No. 673,554. Patented May 7, 1901.
T. L. CARBONE.
SOLDERING APPARATUS.
(Application filed May 31, 1900.)
(No Model.) 2 Sheets—Sheet 1.
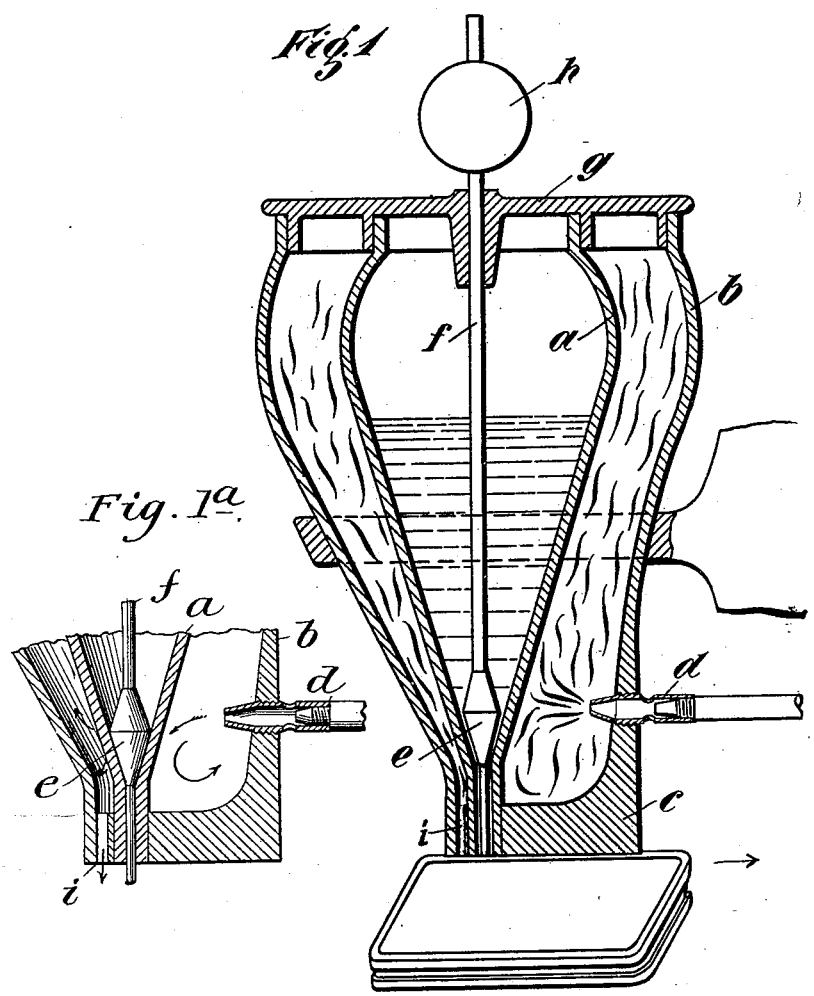
Witnesses.
C. Oberlander
J. B. Clautice
Inventor.
Tito Livio Carbone
By Thomas Drew Stetson
Attorney No. 673,554. Patented May 7, 1901.
T. L. CARBONE.
SOLDERING APPARATUS.
(Application filed May 31, 1900.)
(No Model.) 2 Sheets—Sheet 2.
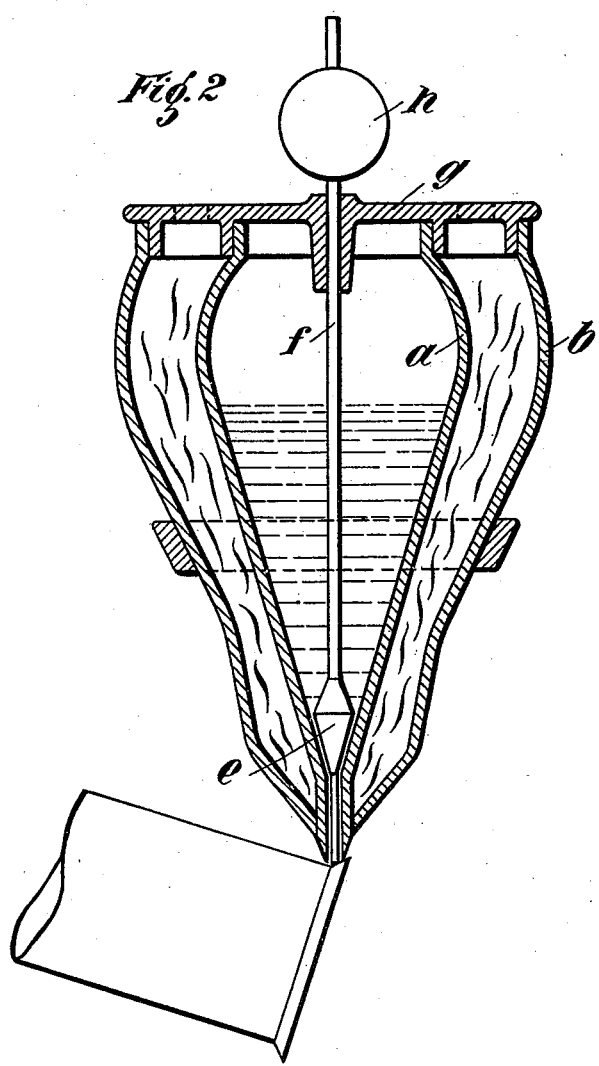
Witnesses.
C. Oberlander
J. B. Clautice
Inventor.
Tito Livio Carbone
By Thomas Drew Stetson
Attorney
THE NORRIS PETERS CO., PHOTO-LITHO., WASHINGTON, D. C.

UNITED STATES PATENT OFFICE.

TITO LIVIO CARBONE, OF BERLIN, GERMANY.

SOLDERING APPARATUS.

SPECIFICATION forming part of Letters Patent No. 673,554, dated May 7, 1901.

Application filed May 31, 1900. Serial No. 18,510. (No model.)

*To all whom it may concern:*

Be it known that I, TITO LIVIO CARBONE, a citizen of Italy, residing at No. 29 Kurfürstendamm, in the city of Berlin, in the Kingdom of Prussia, German Empire, have invented certain new and useful Improvements in Soldering Apparatus, More Particularly Applicable to Machines for Forming Folded Joints on Sheet Metal, of which the following is a specification.

The present invention relates to a new construction of soldering apparatus which can either be employed in combination with machines for making folded joints for soldering the joints as they are formed or it may be used as an independent soldering apparatus.

By means of this apparatus—for example, if a tube or tubular object with folded joint be passed once through or under the same—a faultless hermetical soldering of the folded joint along its entire length may be effected without requiring either previous preparation or subsequent trimming.

The soldering apparatus is of particular advantage for folded-joint-making machines in which a continuous folded joint is made, for example, in such manner that the superposed sheet-metal edges are progressively indented and the indented portions then progressively bent over against the flat portions of the sheet metal. When the new soldering apparatus is employed in combination with such a machine, the tubular or other sheet-metal articles can at one and the same operation have the folded joint formed thereon and the joint be then soldered, the soldering being effected immediately after a portion of the article has had the folded joint formed thereon and while the following portion is still under the folding operation, so that practically the folding of the joint and the soldering thereof take place simultaneously.

In order to make my invention more clear, I refer to the accompanying drawings, in which similar letters denote similar parts throughout the several views, and in which—

Figure 1 is a vertical section through one form of construction of my improved soldering apparatus; and Fig. 1ª is a corresponding section, showing the valve closed. Fig. 2 is also a vertical section taken at right angles to Fig. 1.

Referring to Figs. 1 and 2, $a$ is a receptacle for containing the soldering material, this vessel being surrounded by an outer wedge-shaped casing $b$. The receptacle $a$ is preferably coated internally with platinum for preventing any oxidation of the solder at the sides of the receptacle. The outer tapering casing $b$ is preferably made of copper in order that its bottom part $c$, Fig. 1, may constitute a soldering-tool. The hollow approximately wedge-shaped space between $a$ and $b$ serves to receive a heating medium for melting the solder in $a$ and maintaining it in the fluid condition.

The heating medium can be of various kinds; but it is preferred to combine with the lower part of the casing $b$ a blowpipe or Bunsen burner $d$, Fig. 1, from which a long flame is made to project into the space between $a$ and $b$. The blowpipe or Bunsen burner may, if preferred, be directed slightly upward and obliquely; but however it is directed the current of gas is ultimately compelled to rise, so that the long flame is made to pass in a more or less helical upward direction around the vessel $a$ to the top thereof, so that this is effectually heated at all points. The top is provided with apertures, as shown in dotted lines. If necessary, two or more such burners or heating devices may be employed.

In the lower part of the funnel-shaped receptacle $a$ is a conical valve $e$, the spindle $f$ of which extends downward through the tubular extension of the receptacle $a$ to such an extent that when the valve is closed on its seat the lower end of the spindle projects slightly beyond the tubular extension. The valve-spindle extends upward through the cover $g$ and has its projecting part loaded by a weight $h$.

At the side of the tubular extension at the lower end of $a$, which constitutes the discharge for the solder, the lower part of the casing $b$ is also made with a hole $i$, extending downward on the side opposite to the soldering-tool $c$, as shown at Fig. 1 in dotted lines. This may be elongated so as to constitute a vertical channel there formed in the bottom $b$. Through such hole or channel a portion of the flame escapes downward from the space between $a$ and $b$, heating to the desired degree that portion of the folded joint which is being advanced from that direction before it is supplied with the solder. This heating of a portion of the folded joint can of course be effected by other means—for example, by a branch jet from the blowpipe $d$, arranged to play upon the folded joint before passing under the discharge-passage for the solder.

In Fig. 1 is shown, by way of example, an application of the apparatus to the soldering of a flat tin box, such as a sardine-tin. If the tin be raised and the folded joint of the cover pressed against the discharge-opening for the solder, the slight projecting valve-spindle $f$ in being pushed up will open the valve $e$ sufficiently to allow a regulated quantity of the solder to flow down onto the folded joint. At the same time the tin is moved along in the direction from left to right, so that the fluid solder will form a continuous fillet on the joint, and in passing under the heated soldering-tool $c$ this will complete the soldering operation.

Fig. 1$^a$ shows the valve closed, the stem $f$ projecting sufficiently below the bottom of the soldering-tool to allow the valve to be thereby pushed up when the article to be soldered is held up to it below. The jet of flame projected down from the hole $i$ and playing upon the metal passing under it raises its temperature so that it is conditioned to receive the melted solder. Immediately after passing the solder-hole it is smoothed under the extended surface of the hot mass of metal $c$ and emerges a well-soldered smooth joint.

Fig. 2 shows an application of the apparatus to the soldering of the bottom of a cylindrical can. The soldering-tool $c$ may in this case be formed with a corresponding concavely rounded surface, and to enable the apparatus to be used for variously-formed objects the bottom part of the soldering-tool may be formed as a separate piece, so as to enable pieces of varying form to be applied. The form of soldering-tool shown at Fig. 1 can of course also be used for soldering the longitudinal folded joints of tubular objects. As before stated, the soldering apparatus can be employed either separately, as shown, or combined in any suitable manner with a machine for forming folded joints.

Having now described my invention, what I desire to secure by Letters Patent of the United States, is—

1. In soldering apparatus, the combination with a solder-receptacle having a valve-controlled solder-discharge opening, of a jacket $b$ incasing the receptacle forming an intermediate space, provision for introducing heat into said space, and a heat-discharge directed downward and arranged to heat the immediately-adjacent portion of the article before it reaches the solder-discharge substantially as herein specified.

2. In soldering apparatus the combination with a solder-receptacle having a valve-seat and downward-discharge passage $i$ leading therefrom, of a valve $e$ adapted for said seat and having an extension longer than said passage to project beyond the same when the valve is seated, arranged substantially as herein specified.

In witness whereof I have hereunto set my hand in presence of two witnesses.

TITO LIVIO CARBONE.

Witnesses:
HENRY HASPER,
WOLDEMAR HAUPT.